United States Patent [19]

Zaim

[11] Patent Number: 5,081,864
[45] Date of Patent: Jan. 21, 1992

[54] LEAK PROTECTED VESSEL

[75] Inventor: Adil Z. Zaim, San Francisco, Calif.

[73] Assignee: Omega Environmental, Inc., Bothel, Wash.

[21] Appl. No.: 392,777

[22] Filed: Aug. 11, 1989

[51] Int. Cl.$^5$ .............................................. G01M 3/32
[52] U.S. Cl. .................................... 073/049.2; 73/40; 340/605
[58] Field of Search ................ 73/49.2, 40; 340/605

[56] References Cited

U.S. PATENT DOCUMENTS

| 3,848,765 | 11/1974 | Durkop | 73/49.2 |
|---|---|---|---|
| 4,696,186 | 9/1987 | Sharp | 73/49.2 |
| 4,805,445 | 2/1989 | Grappe | 73/49.2 |
| 4,836,710 | 6/1989 | Sawada | 73/49.2 |

FOREIGN PATENT DOCUMENTS

| 1150248 | 6/1963 | Fed. Rep. of Germany | 73/49.2 |
|---|---|---|---|
| 2352544 | 4/1975 | Fed. Rep. of Germany | 73/49.2 |
| 2629369 | 6/1978 | Fed. Rep. of Germany | 73/49.2 |

Primary Examiner—Hezron E. Williams
Assistant Examiner—Craig Miller
Attorney, Agent, or Firm—Glen R. Grunewald

[57] ABSTRACT

A double-walled vessel for containing fluid, the vessel having an annular space between the walls wherein a compressed gas at a pressure higher than any pressure in the inner vessel is maintained, the vessel including a monitoring device to sense the escape of gas from the annular space such as decrease in its pressure or flow of gas from a replenishing source and to sense the presence of the compressed gas in the inner vessel such as increase in pressure, sensing the composition of the compressed gas within the inner vessel or sensing an increase in flow through a vent, whereby leakage through either the inner vessel wall or the surrounding outer wall is detected and the escape of contained fluid from the inner vessel is prevented.

6 Claims, 1 Drawing Sheet

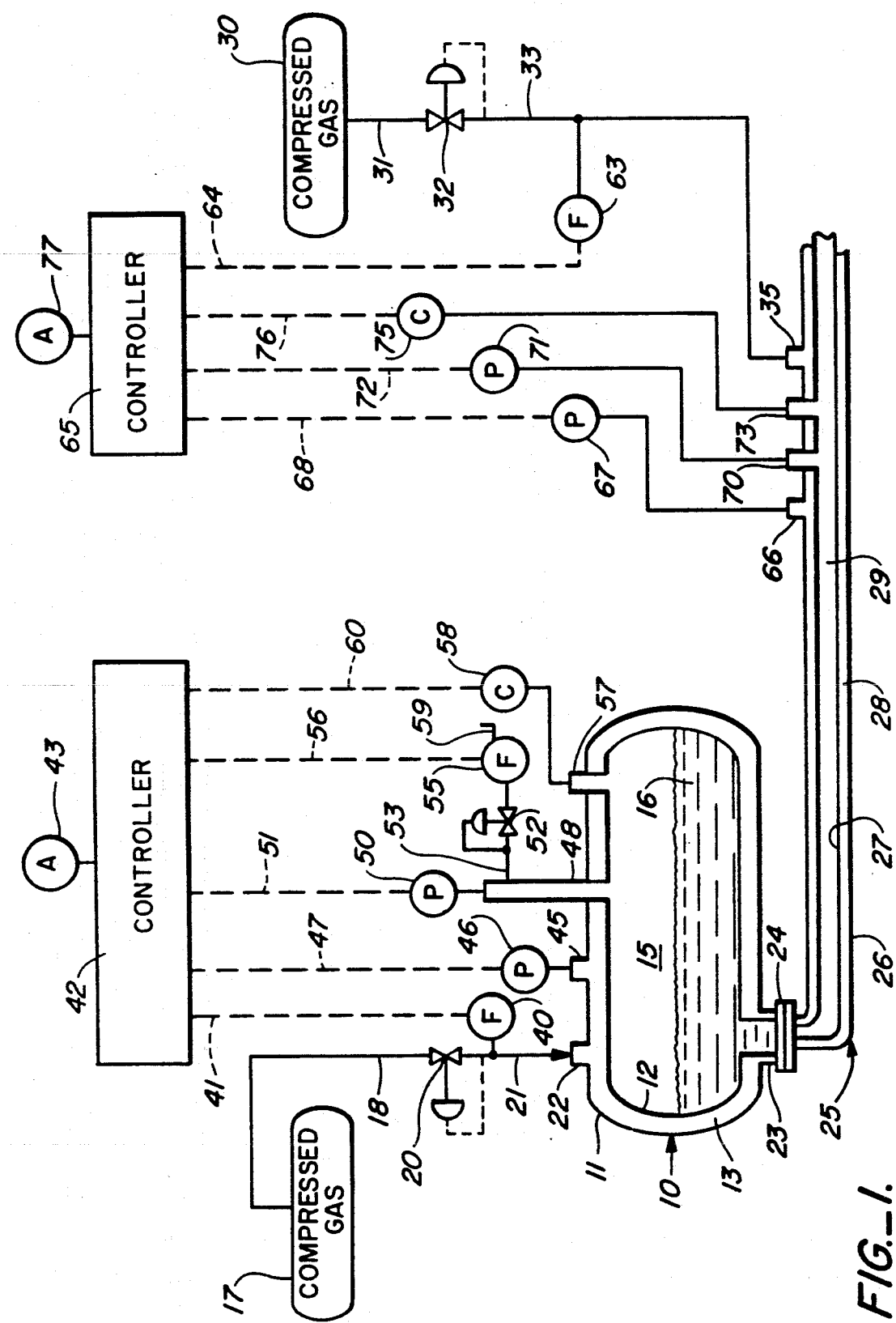
FIG._1.

LEAK PROTECTED VESSEL

TECHNICAL FIELD

This invention is in the field of containment vessels for fluids.

BACKGROUND ART

Many fluids that are transported or stored must be held in containers and protected from leakage. Some fluids pollute the atmosphere or the ground water, others are poisonous and some are simply too expensive to be lost. Some fluids may be maintained at atmospheric pressure while others must be stored under pressure. For many reasons it is important to detect when a vessel storing such fluids leaks and to prevent a leak that occurs as soon as possible.

In the past preventing leakage of fluids from storage vessels was accomplished by building the vessels with greater structural integrity and by using sophisticated inspection techniques to find sites that may ultimately become leak sites. Another technique for preventing leakage is to build double-walled vessels so that leakage from an inner vessel is contained by the outer vessel.

The term vessel includes above-ground and underground storage tanks, under water storage tanks, tanks mounted on trucks or trains and ships as well as piping through which fluid is transported. The term leakage connotes the act of leakage, i.e. the escape of fluid through a hole or opening in a vessel wall. The term leak site connotes the hole, crack, perforation or opening through which leakage occurs.

In spite of the leak prevention measures that have been taken, leakage has inevitably occurred. As a result a technology grew to detect leakage before too much damage was done to the environment or too much valuable material was lost. Leakage detection techniques range from simple monitoring of liquid levels in a storage vessel to detecting the presence of escaping material in the atmosphere or the ground by electronic or chemical means. The objective of all of these leak-detection systems is to learn of the presence of leakage before too much material escapes and to take protective measures to stop the leakage before too much fluid escapes. In other words, these systems must have an escape of fluid through a leak site before the systems become activated to indicate that leakage exists.

DISCLOSURE OF THE INVENTION

This invention is a device and a method that accomplishes both the function of detecting a leak site in a fluid-containing vessel and preventing fluid from escaping from the vessel through the leak site. The device and method of this invention includes an inner wall that serves as a vessel to contain the fluid and an outer wall that surrounds the vessel and forms an annular space between the inner wall and the outer wall. Thus, the fluid-containing vessel is completely surrounded by the annular space.

The invention includes means to maintain a gas pressure within the annular space that is higher than any pressure within the vessel. By way of example, if the interior of the vessel is at atmospheric pressure, the gas pressure in the annular space is maintained at super atmospheric pressure that is great enough to exceed the maximum hydrostatic pressure at the bottom of the vessel. The means to maintain pressure includes a source of high pressure gas that can automatically replenish any gas that leaks from the annular space at the pressure selected to be maintained in the space. Control of the pressure maintained in the annular space may be accomplished by known means such as a pressure-control valve set to maintain a selected predetermined pressure on its down-stream side or to maintain a preselected pressure differential between the interior pressure of the vessel and the pressure in the annular space. Other known means to control pressure in the annular space or pressure differential between the interior of the vessel and the annular space may be used.

The amount of pressure differential maintained between the annular space and the interior of the vessel depends on many things. The main factor is that the differential must be great enough to prevent passage of fluid from the vessel to the annular space. Another factor is that the pressure differential must not be so great as to collapse the wall of the vessel or to put undue strain its seams. The pressure differential should also be related to the capacity of the gas supply to the annular space in that high pressure differentials will exhaust the supply faster than lower pressure differentials. Other factors to consider in establishing a suitable pressure differential will be evident to those skilled in the art.

The invention also includes means to detect the loss of gas from the annular space as well as means to signal such loss of gas. Suitable means to detect the loss of gas may include means that is sensitive to a small, sudden pressure fluctuation in the annular space or means for measuring a small flow of gas from the source of high-pressure gas into the annular space. The means to detect loss of gas in the space is operatively associated with a annunciator that produces a perceivable signal which indicates that gas is escaping from the annular space.

The invention also includes means to detect the presence of the gas in the vessel. Such means may be means to detect a small flow of gas through a vessel vent, means to detect a rise in the vessel pressure, if it is not vented, or means to detect a change in the chemical composition of vapor- phase material in the vessel.

The device of this invention performs both the function of detecting leakage and of preventing loss of fluid from the containing vessel. An unwanted opening or leak site in the vessel wall will cause gas to flow from the annular space through the leak site and into the vessel. The flow of gas into the vessel prevents fluid contained in the vessel from leaking into the annular space. Thus, the invention prevents loss of fluid from the vessel in a manner that is distinct from the double-containment vessels that merely contain fluids that escape from the inner vessel. Prior double-containment vessels may have detectors in their annular spaces to detect the presence of the fluids contained in their inner vessels but leakage from the containing vessel must enter the annular space before it can be detected. Leak sites in the outer walls of such vessels may not be detected at all, in which case the outer wall of the vessel cannot perform its intended function of containing leakage through the inner wall.

Inherent in the structure and method of this invention is detection of leak sites in either the inner wall or the outer wall. Leakage through the outer wall of the device of this invention will cause gas loss from the annular space to be detected and will cause the annunciator to signal the presence of leakage from the annular space. If the presence of gas is not detected within the vessel, the loss of gas through a leak site through the outer wall is established.

BRIEF DESCRIPTION OF THE DRAWING

The drawing is a schematic representation of an apparatus embodying this invention.

BEST MODE FOR CARRYING OUT THE INVENTION

The embodiment of this invention represented by the drawing includes a container for fluid that is generally designated 10. The container has an outer wall 11 and an inner wall 12, the inner wall and outer wall being spaced whereby an annular space 13 is formed between them. The inner wall defines a vessel 15 which is illustrated, in this embodiment, containing a liquid fluid at a level 16. The annular space 13 must be continuous so that all parts of annular space 13 are in continuous fluid contact with all other parts. However, structural bracing and supporting elements, not shown, may be maintained within annular space 13 to support vessel 15 in a manner so that it is completely surrounded by annular space 13. Annular space 13 is so separated from the interior of vessel 15 that a pressure differential may be maintained between them.

Annular space 13 is provided with gas from a gas source 17. Gas Source 17 is illustrated as being a gas bottle but it may be a compressor used instead of or in conjunction with a bottle. The gas from source 17 is provided through line 18 to pressure control valve 20 which controls the pressure of the gas on the downstream side of valve 20. The gas then passes through line 21 and inlet 22 into annular space 13. In normal operation there will be virtually no gas flow through lines 18 and 21. The pressure maintained in annular space 13 will require no gas flow to replenish it unless there is leakage from annular space 13. The pressure of gas in annular space 13 is maintained to be higher than any pressure in the interior of vessel 15, taking into account the pressure in the vapor space within vessel 15 as well as the maximum hydrostatic pressure of any liquid contained therein as well as other factors as stated above.

A fluid outlet 23 is provided to remove contained fluid 16 from vessel 15. Outlet 23 is provided with a flange 24 to connect outlet 23 with a transfer line which is generally designated 25. Transfer line 25 comprises an outer pipe 26 that completely surrounds an inner pipe 27. The interior of inner pipe 27 is in the form of a pipe vessel 29 and an elongated annular space 28 completely surrounds pipe vessel 29. All portions of elongated annular space 28 are in fluid communication even though elongated annular space 28 may include support members to hold pipe vessel 29 out of contact with an outer pipe wall 26. The transfer line 25 may be employed either to withdraw fluid from the interior of vessel 15 or to introduce fluid into vessel 15. Normally one or more transfer lines may be employed to remove fluid from the vessel 15 and one or more transfer lines will be used to add fluid to vessel 15. Additional transfer lines may also be constructed in accordance with the invention.

The annular space 28 may be supplied with compressed gas from a source 30 that passes through line 31 and pressure control valve 32. Pressure control valve 32 discharges into line 33 which is connected to inlet 35 to supply gas to annular space 28.

In operation compressed gas from source 17 supplies annular space 13 with gas at a pressure regulated by control valve 20. In normal operation there is no flow of gas from source 17 to annular space 13. Source 17 and valve 20 insure that gas at a regulated pressure exists in annular space 13. Connected to line 21 is a flow sensor 40 that is capable of measuring small flows of gas, particularly if they start abruptly. Flow sensor 40 may be any appropriate device known to the art and may be based on the principles of an orifice or venturi flow meter, or a flow meter that is based on the cooling effect of a gas flowing past a heated element or any other principle. Flow sensor 40 includes means to transmit a signal indicating the flow of gas and is connected through transmitter 41 to a controller 42. Controller 42 is provided with an annunciator 43 which produces a visible, audible or otherwise perceptible signal or alarm that alerts personnel to investigate a problem. Flow through line 21 indicates that gas in annular space 13 is escaping and the annunciator will alert a observer to the fact that the integrity of annular space 13 has been breached but it will not necessarily indicate the manner of the breach.

In the embodiment illustrated in the drawing, annular space 13 is also provided with a sensor port 45 to which pressure sensor 46 is connected. Pressure sensor 46 not only senses the pressure in annular space 13 but includes means to transmit the sensed pressure through transmitter 47 to controller 42. Among the functions performed by controller 42 is to actuate annunciator 43 if a change in pressure in annular space 13 is sensed in that leakage either through outer wall 11 or inner wall 12 will cause an immediate drop in pressure in annular space 13 before control valve 20 is actuated to replenish the gas that is lost.

Sensor port 48 opens into the interior of vessel 15. A pressure sensor 50 opens into port 48 to sense the pressure in the vapor space of the interior of vessel 15 and to transmit sensed pressure through transmitter 51 to controller 42. Increased pressure sensed by pressure sensor 50 indicates leakage in inner wall 12 and passage of the gas from annular space 13 into vessel 15. The increased pressure will cause controller 42 to activate annunciator 43 to indicate to a person monitoring the system that there is leakage through inner wall 12. Generally, a surge in the sensed pressure will be accompanied by a drop in pressure sensed by sensor 46 or an increase in flow sensed by sensor 40, either of which will confirm that there is leakage through inner wall 12.

If vessel 15 is maintained at atmospheric pressure it may be vented directly through line 53 through flow sensor 55. If vessel 15 is maintained at super-atmospheric pressure it will be vented through line 53 and pressure control valve 52 and it may further be vented through flow sensor 55. A flow detected by sensor 55, whether valve 52 is used or not, indicates leakage through inner wall 12 and the sensed flow of gas is transmitted to controller 42 by transmitter 56. As in the case of other sensors, a signal indicating a flow of gas through sensor 55 will cause controller 42 to activate annunciator 43

Sensor 57 may also be provided and connected to composition sensor 58. Composition sensor may be a spectrographic device particularly sensitive to the gas in annular space 13, it may be a radioactivity detector if the gas in space 13 contains a radioactive tracer component or it may be any other means to detect when the composition of the gas in annular space 13 is found in the interior of vessel 15. Composition sensor 58 will transmit the sensed composition through transmitter 60 to controller 42 which in turn will actuate annunciator 43.

Obviously, all of the sensors illustrated in the drawing may not be used. The drawing includes a number of alternatives which may be used individually or redundantly in any combination. Within the scope of this invention other sensors to indicate the loss of gas from annular space 13 may be employed.

Within the scope of this invention a pipe or transfer line may be dealt with as a fluid-containing vessel in accordance with this invention. Rather than storing a static body of fluid, a transfer line such as the transfer line generally designated 25 maintains a body of fluid that is moving with respect to the inner wall 27. Compressed gas in annular space 28 is generally a static body of gas maintained at a predetermined pressure by control valve 32, the pressure in annular space 28 being significantly higher than the pressure of the fluid in elongated vessel 29. An array of sensors similar to the array employed in vessel 10 is illustrated for use in sensing the integrity of both outer wall 26 and inner wall 27 of transfer line 25.

Line 33 that supplies gas to annular space 28 is provided, in this embodiment, with a flow sensor 63 that is capable of sensing flow through line 33 and transmitting the sensed flow through transmitter 64 to controller 65. If flow sensed through line 33 indicates that compressed gas is escaping from annular space 28, controller 65 is programmed to actuate annunciator 77 when a signal indicating flow through line 33 is received.

Sensor port 66 is also provided to the interior of annular space 28 and it is connected to pressure sensor 67. Pressure sensor 67 is connected through transmitter 68 to controller 65. A sudden drop in pressure in the annular space, as sensed by sensor 67 indicates a loss of gas and when that drop in pressure is transmitted to controller 65 annunciator 77 is actuated.

Sensor ports 70 and 73 open into the interior of elongated vessel 29 and are respectively connected to pressure sensor 71 and composition sensor 75 which in turn are respectively connected through transmitter 72 and transmitter 76 to controller 65. An increase in pressure indicated by pressure sensor 71 or the presence of compressed gas from the annular space indicated by composition sensor 75 will cause annunciator 77 to be actuated.

If the loss of gas from annular space 28 is indicated either by a drop in pressure indicated at pressure sensor 67 or an increase in flow as indicated by flow sensor 63 and no corresponding change is indicated by pressure sensor 71 or composition sensor 75, leakage through outer wall 26 is established. If an increase in pressure is found at pressure sensor 71 or if the composition of the compressed gas is found at composition sensor 75, a leak in inner wall 27 is established. The established leakage is confirmed by appropriate readings of pressure sensor 67 or flow sensor 63.

A very important feature of this invention is that in addition to quickly establishing leakage from the fluid containment system and establishing whether leakage is through the inner wall or the outer wall of the container, the device of this invention prevents the escape of the contained fluid beyond the confines of its own containing vessel. Thus, a leak site in inner wall 12 will cause compressed gas from annular space 13 to enter vessel 15 and ultimately be discharged through vent 59 but the liquid contained in vessel 15 will neither pass into annular space 13 nor beyond the confines of the doubled-walled containment vessel. The same is true in transfer line 25. The higher pressure compressed gas in annular space 28 will prevent fluid from escaping the confines of inner wall 27 because any leak site will cause gas to flow from the annular space to the interior of elongated vessel 29. As illustrated, the flange 24 separates the vessel 10 and the transfer line 25 into two separate systems, each with its own sensors and sensor ports. Although both the transfer line 25 and the vessel 10 could function with a continuous annular space, isolating one system from another pinpoints the location of leakage with greater accuracy. Although each of the two systems illustrated has a separate controller and annunciator, a single controller and a single annunciator may be employed if the controller is otherwise adapted to indicate which system has leakage. Additionally, although the illustrated embodiment has been described with respect to a liquid phase contained fluid, the system is equally adaptable to a gaseous contained fluid. When the contained fluid is a gas the system must be modified, for example, by including means to remove stored fluid from vessel 15 to a different storage container so that the fluid in vessel 15 is not vented to the atmosphere. However, sensors 40, 46, 50 and 58 will very quickly signal leakage through inner wall 12 so that corrective measures can be taken immediately upon the occurrence of leakage.

I claim:

1. The method to detect leakage and prevent escape of fluid from the inner vessel of a double wall container having an annular space between the inner wall and the outer wall, said annular space being hermetically sealed from the interior of a vessel defined by said inner wall, said double wall vessel having means to provide compressed gas to said annular space, means to detect loss of compressed gas from said annular space and means to detect the presence of said compressed gas in said vessel, comprising:

providing a compressed gas to said annular space at a controlled pressure higher than the highest pressure in said vessel and in sufficient volume to prevent leakage of said fluid through a leak site in said inner wall;

detecting the escape of said compressed gas from said annular space; and detecting the presence of said compressed gas in said vessel, whereby leakage through the inner wall is established.

2. The method of claim 1 including detecting the escape of said compressed gas by the step of monitoring flow of compressed gas to said annular space.

3. The method of claim 1 including detecting the escape of said compressed gas by the step of monitoring the pressure of compressed gas in said annular space.

4. The method of claim 1 including detecting the presence of said compressed gas by the step of monitoring the composition of gas within said vessel.

5. The method of claim 1 including detecting the presence of said compressed gas by the step of monitoring the pressure in said vessel.

6. The method of claim 1 including detecting the presence of said compressed gas by the step of monitoring flow through a went from said vessel.

* * * * *

UNITED STATES PATENT AND TRADEMARK OFFICE
CERTIFICATE OF CORRECTION

PATENT NO. : 5,081,864
DATED : January 21, 1992
INVENTOR(S) : Adil Zafer Zaim

It is certified that error appears in the above-identified patent and that said Letters Patent is hereby corrected as shown below:

Column 2 line 19, after "strain" insert --on--.
Column 2 line 33, "a" should be --an--.
Column 4 line 18, "a" should be --an--.
Claim 6, last line, "went" should be --vent--.

Signed and Sealed this

Twenty-second Day of June, 1993

Attest:

MICHAEL K. KIRK

Attesting Officer

Acting Commissioner of Patents and Trademarks